(12) United States Patent
Zhang et al.

(10) Patent No.: US 11,435,470 B2
(45) Date of Patent: Sep. 6, 2022

(54) MULTI-TARGET LIFE DETECTION METHOD BASED ON RADAR SIGNAL AND DETECTION RADAR

(71) Applicant: AIR FORCE MEDICAL UNIVERSITY, Shaanxi (CN)

(72) Inventors: Yang Zhang, Shaanxi (CN); Jianqi Wang, Shaanxi (CN); Fulai Liang, Shaanxi (CN); Hao Lv, Shaanxi (CN); Ziqi Zhang, Shaanxi (CN); Zhao Li, Shaanxi (CN); Huijun Xue, Shaanxi (CN)

(73) Assignee: AIR FORCE MEDICAL UNIVERSITY, Xi'an (CN)

( * ) Notice: Subject to any disclaimer, the term of this patent is extended or adjusted under 35 U.S.C. 154(b) by 151 days.

(21) Appl. No.: 17/067,778

(22) Filed: Oct. 12, 2020

(65) Prior Publication Data
US 2021/0033724 A1 Feb. 4, 2021

Related U.S. Application Data

(63) Continuation of application No. PCT/CN2019/110304, filed on Oct. 10, 2019.

(30) Foreign Application Priority Data

Oct. 15, 2018 (CN) .......................... 201811194565.2

(51) Int. Cl.
*G01S 13/00* (2006.01)
*G01S 13/88* (2006.01)
(Continued)

(52) U.S. Cl.
CPC ............ *G01S 13/888* (2013.01); *G01S 7/292* (2013.01); *G01S 7/411* (2013.01)

(58) Field of Classification Search
None
See application file for complete search history.

(56) References Cited

U.S. PATENT DOCUMENTS

2018/0275259 A1* 9/2018 Ott ...................... G01S 13/5246

FOREIGN PATENT DOCUMENTS

| CN | 102058411 A | 5/2011 |
| CN | 103169449 A | 6/2013 |

(Continued)

OTHER PUBLICATIONS

Alkanat, T., Tunali, E., Oz, S. (2015). A real-time, automatic target detection and tracking method for variable number of targets in airborne imagery (Year: 2015).*

*Primary Examiner* — Erin F Heard
*Assistant Examiner* — Hailey R Le

(57) ABSTRACT

Provided is a multi-target life detection method based on radar signals. The method includes: performing time accumulation in a slow time direction on a preprocessed echo signal to obtain a first echo signal; performing an envelope extraction of inflection points on the first echo signal to obtain a second echo signal; calculating an average value of all amplitude signals in the second echo signal other than M marked amplitude signals; and in response to a ratio of a marked amplitude signal to the average value being greater than a threshold, determining that a living target exists at a radar detection distance corresponding to the marked amplitude signal. According to the life detection method of the present disclosure, a normalization method is adopted to normalize signal amplitudes of the radar in a dimension of fast time (distance). In addition, two envelope extractions of inflection points may be performed.

10 Claims, 5 Drawing Sheets

(51) Int. Cl.
*G01S 7/292* (2006.01)
*G01S 7/41* (2006.01)

(56) References Cited

FOREIGN PATENT DOCUMENTS

| | | |
|---|---|---|
| CN | 103245976 A | 8/2013 |
| CN | 103308899 A | 9/2013 |
| CN | 106093868 A | 11/2016 |
| CN | 108008391 A | 5/2018 |
| CN | 109521422 A | 3/2019 |
| JP | 2017203671 A | 11/2017 |

* cited by examiner

MULTI-TARGET LIFE DETECTION METHOD BASED ON RADAR SIGNAL AND DETECTION RADAR

CROSS-REFERENCE TO RELATED APPLICATIONS

The present application is a continuation of International Application No. PCT/CN2019/110304, filed on Oct. 10, 2019, which claims priority to Chinese Patent Application No. 201811194565.2, filed on Oct. 15, 2018, both of which are hereby incorporated by reference in their entireties.

TECHNICAL FIELD

The present disclosure relates to the field of a life detection method and apparatus, and more particularly, to a multi-target life detection method based on radar signals and a detection radar.

BACKGROUND

A life detection radar is a new type of radar, which involves both biomedical engineering and radar technologies and can penetrate through nonmetallic media (such as wood, soil, bricks, gravels, etc.) to detect vital signs (mainly respiration signals) in a contactless manner at a remote distance. The life detection radar technology neither puts any restrictions on a detected object, nor requires a connection to contact electrodes, sensors, cables, and the like. Furthermore, the life detection radar technology may penetrate through certain media to detect and identify the human body at a certain distance. Therefore, such a technology has been widely applied in personnel search and rescue after disasters (earthquakes, landslides, mine disasters, etc.), monitoring through walls in anti-terrorist fights and battlefield reconnaissance. Featured by strong penetrability and distance information included in echoes, the ultra-wide band technology has become the mainstream technology applied to life detection radars.

Regarding existing life detection radars, there are many researches on signal processing and identification algorithms for single-target detection and positioning, but few researches on multi-target detection and location identification. At present, through-wall detection can be applied on only three or fewer human targets. Moreover, due to a low accuracy of a single channel in multi-target detection and axial distance distinction, the targets need to be spaced by a certain distance in axial and tangential directions of the radar. Single-channel axial detection and identification of several targets also has the following problems. First, signal amplitudes of targets distributed at different axial distances vary greatly since radar waves attenuate with the increase in distance. Especially when a target is on the periphery of a detection area, the amplitude of the target becomes very small, which makes it difficult to extract and identify the target from the background noise. Second, the signal of the target will produce a certain high-amplitude area behind it, i.e., the phenomenon of "tailing". Such "tailing" often causes erroneous identification of one target into two targets.

The current ultra-wide band life detection radars mainly include monostatic radars and multistatic radars with fixed antenna arrays. The main problems of the current ultra-wide band life detection radars will be described as follows. First, monostatic radars cannot locate targets, and due to their single detection path, the monostatic radars may fail to penetrate through thick reinforced concrete in blind detection. Second, although the multistatic radars with fixed antenna arrays have more than one detection path and can achieve multi-target detection, given that the antenna arrays are fixed, an individual probe cannot flexibly adapt to rugged ruin surfaces, such that poor coupling between the probe and the ruin surface may result in attenuation of electromagnetic waves, thereby affecting the penetration ability and detection effect. In addition, the antenna arrays being fixed also causes a problem that the detection path cannot be freely selected based on site conditions.

SUMMARY

The present disclosure aims to provide a multi-target life detection method based on radar signals and a detection radar, so as to solve problems such as erroneous identification resulted from low accuracy in detecting a position of a living target through life detection methods in the related art.

In view of this, the present disclosure adopts the following technical solutions.

A multi-target life detection method based on radar signals is provided. The method includes: step 1 of transmitting a life detection radar signal and receiving an original echo signal of the life detection radar signal; step 2 of performing distance accumulation and noise cancellation on the original echo signal sequentially to obtain a preprocessed echo signal; step 3 of performing time accumulation on the preprocessed echo signal to obtain a first echo signal, the first echo signal including a plurality of amplitude signals and each amplitude signal corresponding to one radar detection distance; and step 4 of performing an envelope extraction of inflection points on the first echo signal to obtain a second echo signal, wherein the envelope extraction of inflection points includes: finding a plurality of amplitude signals of inflection points in the first echo signal; and zeroing all amplitude signals in the first echo signal other than the plurality of amplitude signals of inflection points, and an amplitude signal of an inflection point is greater than two adjacent amplitude signals on left and the right sides of the amplitude signal of the inflection point; step 5 of sorting amplitude signals in the second echo signal in descending order of amplitudes, selecting first M amplitude signals as M marked amplitude signals, and calculating an average value of all amplitude signals in the second echo signal other than the M marked amplitude signals, M being a positive integer greater than 1; and step 6 of obtaining a ratio of each marked amplitude signal to the average value; in response to the ratio being greater than a threshold, determining that a fluctuation exists in a marked amplitude signal corresponding to the ratio, that is, a living target exists at a radar detection distance corresponding to the marked amplitude signal; otherwise, determining that no living target exists; and completing a life detection.

Further, step 2 includes: step 21 of performing the distance accumulation on the original echo signal to obtain a distance-accumulated echo signal; step 22 of performing normalization on the distance-accumulated echo signal to obtain a normalized echo signal; and step 23 of performing denoising on the normalized echo signal to obtain the preprocessed echo signal.

Further, in the step 23 of performing the denoising on the normalized echo signal, smooth filtering is adopted to obtain the preprocessed echo signal.

Further, in the step 3 of performing the time accumulation on the preprocessed echo signal, the time accumulation is performed on $200^{th}$ to $1,200^{th}$ paths of echo signal in the preprocessed echo signal.

Further, the second echo signal is obtained by performing two envelope extractions of inflection points on the first echo signal.

Further, the step 5 includes: step 51 of sorting the amplitude signals in the second echo signal in descending order of amplitudes, and then selecting the first M amplitude signals as the M marked amplitude signals; step 52 of zeroing Z amplitude signals before and after each marked amplitude signal in the second echo signal, Z being a positive integer; and step 53 of calculating an average value of all amplitude signals in the second echo signal other than the three marked amplitude signals.

Further, M=3, and Z=5.

A multi-target life detection radar configured to implement the multi-target life detection method as described above, is provided. The multi-target life detection radar includes an array antenna module, a radar main control module and a control display. The array antenna module is connected to the radar main control module, and is configured to transmit a life detection radar signal and to receive an original echo signal of the life detection radar signal. The radar main control module is connected to the control display, and is configured to perform distance accumulation and noise cancellation on the original echo signal sequentially to obtain a preprocessed echo signal. The radar main control module is further configured to perform time accumulation on the preprocessed echo signal to obtain a first echo signal, the first echo signal including a plurality of amplitude signals and each amplitude signal corresponding to one radar detection distance. The radar main control module is further configured to perform an envelope extraction of inflection points on the first echo signal to obtain a second echo signal. The envelope extraction of inflection points includes finding a plurality of amplitude signals of inflection points in the first echo signal and zeroing all amplitude signals in the first echo signal other than the plurality of amplitude signals of inflection points, and an amplitude signal of an inflection point is greater than two adjacent amplitude signals on left and right sides of the amplitude signal of the inflection point. The radar main control module is further configured to sort amplitude signals in the second echo signal in descending order of amplitudes, to select first M amplitude signals as M marked amplitude signals, and to calculate an average value of all amplitude signals in the second echo signal other than the M marked amplitude signals, M being a positive integer greater than 1. The radar main control module is further configured to obtain a ratio of each marked amplitude signal to the average value; in response to the ratio being greater than a threshold, to determine that a fluctuation exists in a marked amplitude signal corresponding to the ratio, that is, a living target exists at a radar detection distance corresponding to the marked amplitude signal; otherwise, to determine that no living target exists; and the control display is configured to output a detection result of the radar main control module, the detection result indicating whether a living target exists within the radar detection distance and a distance from the living target to the array antenna module.

Further, the array antenna module includes one radar transmitting antenna and a plurality of radar receiving antennas. The radar transmitting antenna is movably connected to each of the plurality of radar receiving antennas (2) through a foldable arm. The radar transmitting antenna is configured to transmit the life detection radar signal. The plurality of radar receiving antennas is configured to receive the original echo signal of the life detection radar signal.

Further, the array antenna module includes one radar transmitting antenna and four radar receiving antennas.

Compared with the prior art, the present disclosure has the following technical features.

1. According to the life detection method of the present disclosure, a normalization method is adopted to normalize signal amplitudes of the radar in a dimension of fast time (distance), such that the problem of energy attenuation caused by the increase in distance during transmission of radar signals is solved, and a misdetection rate of remote targets is effectively reduced.

2. According to the life detection method of the present disclosure, the envelope extraction of inflection points is performed twice, including removing "tailing" before and after the marked amplitude signals to reduce erroneous identification of targets caused by the "tailing" effect, such that the multi-target axial identification accuracy is improved.

3. According to the life detection radar of the present disclosure, a four-channel ultra-wide band radar system having one transmitter and four receivers is adopted. Consequently, the number of detection paths is increased and the probability of detecting a target is raised.

4. The five-joint metal foldable arm structure is adopted between the transmitting antenna and respective receiving antennas of the life detection radar according to the present disclosure, which increases the detection flexibility of life detection in complex ruin sites, so that each transmitting and receiving unit achieves contact coupling detection with ruin surfaces, the penetrability and detection efficiency are effectively improved, and the needs of rapid detection and positioning of several targets buried under ruins are satisfied.

Figure 1:
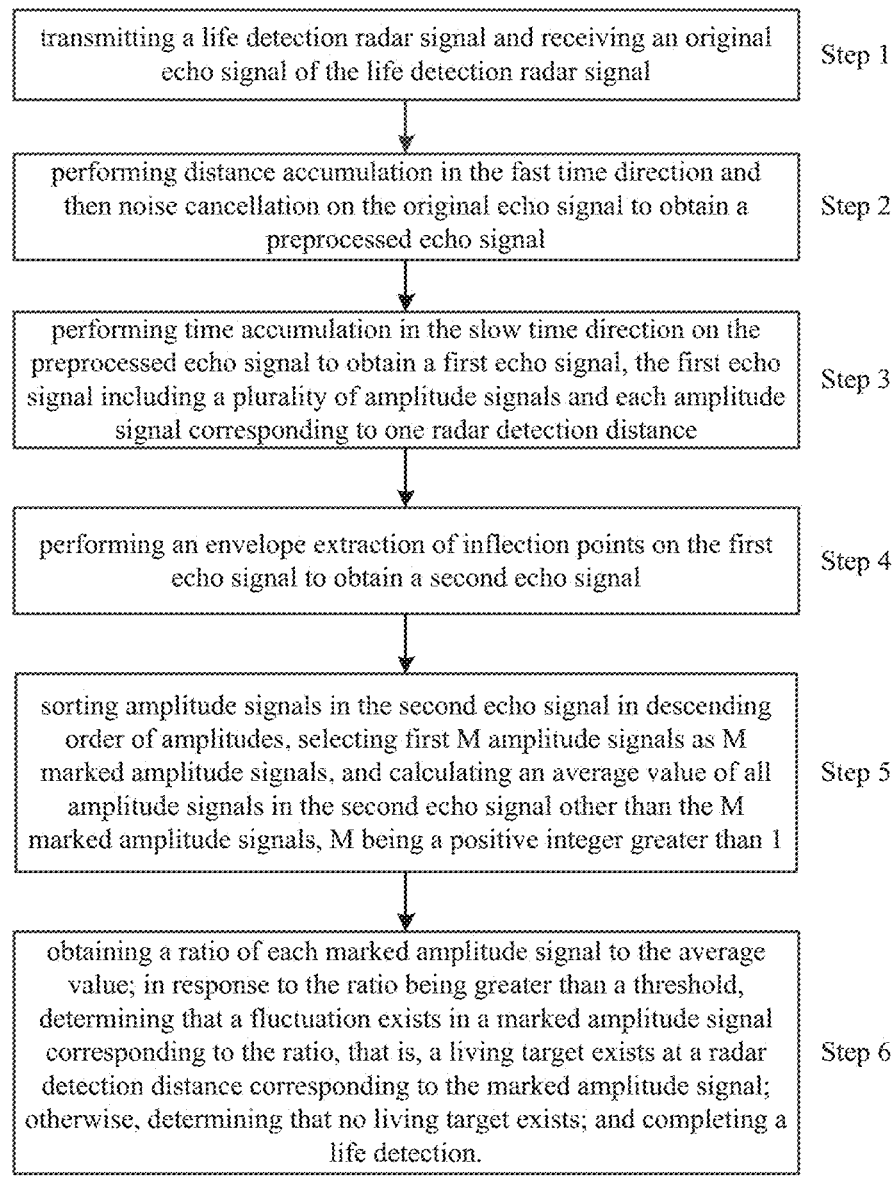
FIG. 1 is a flowchart of a multi-target life detection method according to the present disclosure.

Reference numerals in the drawings: 1—radar transmitting antenna, 2—radar receiving antenna, 21—first radar receiving antenna, 22—second radar receiving antenna, 23—third radar receiving antenna, 24—fourth radar receiving antenna, A—a first human target, B—a second human target, X—a first target, Y—a second target, Z—a third target.

DESCRIPTION OF EMBODIMENTS

The technical solutions of the present disclosure will be further explained using the following specific embodiments provided by the inventor.

Embodiment 1

The present embodiment discloses a multi-target life detection method based on radar signals. As illustrated in FIG. 1, the method includes the following steps.

At step 1, a life detection radar signal is transmitted, and an original echo signal of the life detection radar signal is received.

In the present embodiment, the life detection radar signal is reflected when encountering an object, and thus the radar original echo signal is formed. When the life detection radar signal encounters a static object, the radar original echo signal is a stable fixed value. However, when the life detection radar signal encounters a living body, the radar original echo signal will fluctuate. In this case, such small fluctuations may be used to detect living bodies. The living bodies include animals, humans, and other living objects. In this embodiment, a living target merely refers to a living human, and thus the living bodies include living targets.

Figure 2:
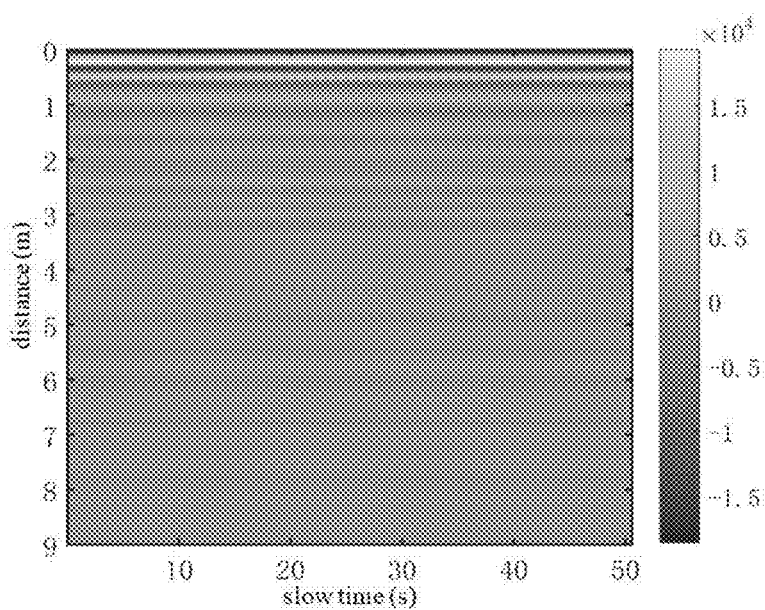
FIG. 2 is a schematic diagram of a two-dimensional matrix of an original echo signal of a radar.

A radar original echo signal R received by a biological radar may be expressed as a two-dimensional matrix R(m, n) as illustrated in FIG. 2, where m denotes a row vector, which represents time, n denotes a column vector, which represents a detection distance, $m \in M$, $n \in N$, and M and N are positive integers. The horizontal axis in FIG. 2 represents a detection time, which is referred to as "slow time", and the detection time is in a unit of second. A direction along the detection time is a slow time direction. The vertical axis in FIG. 2 represents a detection distance, which is referred to as "fast time", and the detection distance is in a unit of nanosecond or meter. A direction along the detection distance is a fast time direction. The calculation relationship between fast time and distance is denoted by: distance (m)=fast time (ns)×propagation speed (m/ns) of electromagnetic waves in a medium. At a certain moment, a signal along the fast time direction, i.e., the column vector of the two-dimensional matrix, is called a "channel signal"; and at a certain distance point, a signal along the slow time direction, i.e., the row vector of the two-dimensional matrix, is called a "point signal".

At step 2, distance accumulation in the fast time direction and noise cancellation are performed on the original echo signal sequentially to obtain a preprocessed echo signal.

The radar original echo signal is stored in the two-dimensional matrix R(m, n), where each fast time signal includes 2,048, 4,096 or 8,192 pieces (which may be optionally set based on the detection distance) of short integer data. A sampling rate in the slow time dimension is 64 Hz. Even if each fast time signal merely includes 2,048 pieces of data, the amount of data received by the radar original echo signal per second is: 2048×64×2=262144 bytes. As the amount of data is large, the speed of signal processing and target identification in the later stage may be affected.

Since modulation schemes of radar echoes at adjacent distance points in the fast time direction are roughly the same and have a certain correlation, the distance accumulation is first performed on the two-dimensional matrix R(m, n) along the fast time direction in a spatial domain without affecting useful information, thereby reducing the amount of calculation, achieving real-time analysis and providing a detection result in real time.

Step 2 is performed by the following steps.

At step 21, the distance accumulation in the fast time direction is performed on the original echo signal to obtain the distance-accumulated echo signal.

In the step, the distance accumulation algorithm is denoted by Expression I:

$$R_1(k, n) = \frac{1}{L} \sum_{m=L(k-1)+1}^{Lk} R(m, n). \qquad \text{Expression I}$$

In the above expression, $R_1(k,n)$ denotes a two-dimensional matrix form of the distance-accumulated echo signal, a size of the matrix is K×N, where k=1, 2, ..., K, K denotes a number of distance sampling points in the fast time dimension after the distance accumulation and $$K = \left\lfloor \frac{M}{L} \right\rfloor,$$

L denotes a width of a window of the distance accumulation along the fast time dimension, and the symbol "$\lfloor \ \rfloor$" denotes rounding down. A large number of experimental studies have shown that when the number of sampling points of fast time signals is set to 2,048 and the width L of the window of the distance accumulation is equal to 10, after the distance accumulation, the distance sampling points of the original echo signal may be reduced from 2,048 in R(m, n) to about 200 in $R_1(k, n)$, namely, dimensions of the matrix is reduced from 2,048 to 200. In addition, after subsequent signal processing and target identification, the distance-accumulated signal has the same detection effect as the original echo signal before the distance accumulation. In this manner, the signal processing speed may be effectively increased and the operating efficiency of search and rescue of the radar may be improved. At the same time, the distance accumulation on the signal in the fast time dimension may also suppress high frequency interference from the fast time signal to a certain extent.

At step 22, normalization is performed on the distance-accumulated echo signal to obtain the normalized echo signal.

During transmission of the radar signal, there is a phenomenon of energy attenuation as the distance increases. In order to reduce signal distortion caused by the phenomenon, in this step, normalization is performed on the distance-accumulated signal $R_1(k, n)$ along the fast time dimension by using Expression II, such that the normalized echo signal is obtained:

$$R_2(k, n) = 2 \times \frac{R_1(k, n) - \min_{0 \le k \le K}[R_1(k, n)]}{\max_{0 \le k \le K}[R_1(k, n)] - \min_{0 \le k \le K}[R_1(k, n)]} - 1. \qquad \text{Expression II}$$

In Expression II, $R_2(k, n)$ denotes the two-dimensional matrix of the normalized echo signal, a size of the matrix is K×N, and N denotes a number of slow time signals included in data $R_1(k, n)$, i.e., a number of sampling points in the slow time. After normalization, the signal amplitudes range from −1 to 1, and sizes (numbers of rows and columns) of the signals remain unchanged.

At step 23, denoising is performed on the normalized echo signal to obtain the preprocessed echo signal.

The normalized echo signal still includes static clutter reflected by walls and other stationary objects in the detection environment. Such static clutter forms strong fundamental frequency interference, thereby covering micro-motion signals from a human body. The difference between interference from static clutter and the micro-motion signals from the human body lies in that interference from static clutter does not change with time, while the micro-motion signals from the human body change with time.

In an implementation, smoothing filtering is used to subtract an average value of corresponding slow-time signals from the normalized echo signal to achieve a purpose of removing interference from static clutter.

$$R_3(k, n) = R_2(k, n) - \frac{1}{N}\sum_{n=1}^{N} R_2(k, n). \qquad \text{Expression III}$$

In Expression III, $R_3(k, n)$ represents a two-dimensional matrix form of the preprocessed echo signal.

At step 3, time accumulation in the slow time direction is performed on the preprocessed echo signal to obtain a first echo signal. The first echo signal includes a plurality of amplitude signals, and each amplitude signal corresponds to one radar detection distance.

After the interference from fundamental frequency is removed, in order to further eliminate coincidences in the detection result and to amplify a difference between target information and interference information, the time accumulation is performed on the preprocessed echo signal in this step.

The preprocessed echo signal is in a form of a two-dimensional matrix, in which each row represents an amplitude signal at each time point at a certain distance. In other words, one distance originally corresponding to a plurality of amplitude signals in slow time is compressed into one distance corresponding to one time-accumulated amplitude signal. Since a trapped living body cannot move, the distance will not change, but an amplitude signal of the trapped living body will be much stronger than that of surrounding inanimate objects over time. Consequently, the accumulation in the slow time direction is equivalent to making an amplitude signal of a living body much stronger than that of other inanimate objects, thereby improving the accuracy of life detection.

In an implementation, the time accumulation is performed on $200^{th}$ to $1200^{th}$ paths of echo signal in the preprocessed echo signal, and denoted by Expression IV:

$$R_4(k) = \sum_{n=200}^{1200} |R_3(k, n)|. \qquad \text{Expression IV}$$

In Expression IV, $R_4(k)$ denotes a column vector form of the first echo signal.

In the step, each amplitude signal corresponds to one radar detection distance, and may be obtained by Expression V:

$$D_k = \frac{k}{K}\text{Range}. \qquad \text{Expression V}$$

In Expression V, Range denotes a detection range. In the embodiment, Range corresponds to 60 ns, that is, 9 meters.

At step 4, an envelope extraction of inflection points is performed on the first echo signal to obtain a second echo signal.

The envelope extraction of inflection points includes finding a plurality of amplitude signals of inflection points in the first echo signal, and zeroing all amplitude signals in the first echo signal other than the plurality of amplitude signals of inflection points.

An amplitude signal of an inflection point is greater than two adjacent amplitude signals on left and right sides of the amplitude signal of the inflection point.

In the step, due to the complexity of the electromagnetic environment, after the processing of time accumulation, it is still difficult to find a detected target directly from the radar signal $R_4(k)$. Therefore, it is necessary to further remove the interference. One of the main interferences in radar echoes is sidelobe interference near peaks, and the sidelobe presents a characteristic of attenuation to both sides. In the step, peak signals are identified through the inflection points, that is, when an amplitude signal at a point is greater than amplitude signals at the two adjacent points on left and right sides of the point, the point is called an inflection point. In this step, it is considered that inflection points in the radar signal $R_4(k)$ are more practical for target identification, so points, namely inflection points, that meet the following condition are all reserved:

$$R_4(k) > R_4(k+1) I\ R_4(k) > R_4(k-1) \qquad \text{Expression VI.}$$

Values of points that do not meet the above condition are set to zero, and points that meet the condition are stored in a new one-dimensional array in an original position order so as to form a new one-dimensional array, that is a vector $R_5(k)$, after a first envelope filtering extraction.

Facts show that interference still exists in the waveform after the first envelope extraction of inflection points, and thus the target cannot be accurately identified. Therefore, as an implementation, a second envelope extraction of inflection points is further performed on the first echo signal to obtain the second echo signal, that is, to keep all the points (i.e., inflection points after two extractions) in the radar signal $R_5(k)$ that meet the following condition:

$$R_5(k) > R_5(k+a) I\ R_5(k) > R_5(k-b) \qquad \text{Expression VII.}$$

In the expression, $R_5(k+a)$ denotes the first non-zero value on the right of $R_5(k)$ and $R_5(k-b)$ denotes the first non-zero value on the left of $R_5(k)$.

The second envelope extraction of inflection points is performed in accordance with the above steps to form a new second echo signal $R_6(k)$ in a form of a one-dimensional array. Most interference is removed from the radar signal after the two envelope extractions of inflection points.

For example, the first echo signal in the form of a one-dimensional matrix is expressed as [1434, 1578, 1657, 976, 1014, 1002, 587, 963, 1011, 936, 1064, 1216, 948, 1164, 831], and after the first envelope extraction of inflection points, [0, 0, 1657, 0, 1014, 0, 0, 0, 1011, 0, 0, 1216, 0, 1164, 0] is obtained. After the second envelope extraction of inflection points, the second echo signal in the form of the one-dimensional matrix is expressed as [0, 0, 1657, 0, 0, 0, 0, 0, 0, 0, 0, 1216, 0, 0, 0].

At step 5, amplitude signals in the second echo signal are sorted in descending order of amplitudes. The first M amplitude signals are selected as M marked amplitude signals. An average value of all amplitude signals in the second echo signal other than the M marked amplitude signals is calculated. M is a positive integer greater than 1.

In the step, amplitudes of the M marked amplitude signals are higher than amplitudes of the remaining amplitude signals in the second echo signal. Therefore, there may be living bodies at radar detection distances corresponding to the M marked amplitude signals, and then positions of the living bodies may be found by determining the M marked amplitude signals.

To be specific, the step includes the following steps.

At step 51, after sorting the amplitude signals in the second echo signal in descending order of amplitudes, the first M amplitude signals are selected as the M marked amplitude signals.

In the step, the first M largest values in the data $R_6(k)$ obtained after the second envelope extraction of inflection points are found one by one, and marked as $Max_1$, $Max_2$, ..., and $Max_M$ sequentially.

At step 52, Z amplitude signals before and after each marked amplitude signal in the second echo signal are zeroed, where Z is a positive integer.

In the step, in order to improve the accuracy of identification, it is necessary to remove the affection of the "tailing" effect. Since a chest wall of a human body has a certain thickness, there cannot be another target within a certain distance range of a certain marked amplitude signal, but "tailing" generated by the target at the marked amplitude signal. In order to remove the "tailing", the Z amplitude signals before and after the marked amplitude signal are zeroed.

In an implementation, when the detection object is a human body, M=3, and Z=5.

The first three largest values (the first largest value, the second largest value, and the third largest value) in the data $R_6(k)$ obtained after the second envelope extraction of inflection points are found out one by one, and marked as $Max_1$, $Max_2$, and $Max_3$ sequentially. Finally, interference near the position of the target is removed (since the chest wall of the human body has a certain thickness, there cannot be another target within a certain distance range of a target point), and values of five points before and after the target point are zeroed.

At step 53, an average value of all amplitude signals in the second echo signal other than the M marked amplitude signals is calculated.

In the step, an average value Background is obtained through Expression VIII:

$$\text{Background} = \frac{1}{K-M}\left(\sum_{k=1}^{K} R_6(k) - \text{Max}_1 - \text{Max}_2 - \ldots - \text{Max}_M\right).$$
Expression VIII At step 6, a ratio of each marked amplitude signal to the average value is obtained.

If the ratio is greater than a threshold, it is determined that a fluctuation exists in the marked amplitude signal corresponding to the ratio, that is, a living target exists at a radar detection distance corresponding to the marked amplitude signal. Otherwise, it is determined that no living target exists. And then, the life detection is completed.

In the embodiment, the ratio Q of each marked amplitude signal to the average value is obtained through Expression IX:

$$Q = \frac{\text{Max}_m}{\text{Background}}(m = 1, 2, \ldots, M).$$
Expression IX If the ratio Q is greater than the threshold, it is determined that a living target exists. If the ratio Q is smaller than or equal to the threshold, it is determined that no living target exists. The threshold may be adjusted based on a signal-noise ratio of an actual signal. Different thresholds correspond to different levels of target identification sensitivity.

In the embodiment, if the ratio of each marked amplitude signal to the average value is smaller than the threshold, it may be determined that there is no living target in the current detection area. In the embodiment, the living target is a human body.

Embodiment 2

The embodiment discloses a multi-target life detection radar for implementing the multi-target life detection method according to Embodiment 1. The multi-target life detection radar includes an array antenna module, a radar main control module and a control display.

The array antenna module is connected to the radar main control module, and is configured to transmit a life detection radar signal and to receive an original echo signal of the life detection radar signal after the life detection radar signal is reflected by a living body.

The radar main control module is connected to the control display, and is configured to perform distance accumulation along a fast time direction and noise cancellation on the original echo signal to obtain a preprocessed echo signal.

The radar main control module is further configured to perform time accumulation along a slow time direction on the preprocessed echo signal to obtain a first echo signal. The first echo signal includes a plurality of amplitude signals, and each amplitude signal corresponds to one radar detection distance.

The radar main control module is further configured to perform an envelope extraction of inflection points on the first echo signal to obtain a second echo signal. The envelope extraction of inflection points includes finding a plurality of amplitude signals of inflection points in the first echo signal, and to zeroing all amplitude signals in the first echo signal other than the plurality of amplitude signals of inflection points. An amplitude signal of an inflection point is greater than two adjacent amplitude signals on left and right sides of the amplitude signal of the inflection point.

The radar main control module is further configured to sort amplitude signals in the second echo signal in descending order of amplitudes, to select first M amplitude signals as M marked amplitude signals, and to calculate an average value of all amplitude signals in the second echo signal other than the M marked amplitude signals. M is a positive integer greater than 1.

The radar main control module is further configured to obtain a ratio of each marked amplitude signal to the average value. If the ratio is greater than a threshold, it is determined that a fluctuation exists in the marked amplitude signal corresponding to the ratio, that is, a life target exists at a radar detection distance corresponding to the marked amplitude signal. Otherwise, it is determined that no target exists.

The control display is configured to output a detection result of the radar main control module. The detection result indicates whether a life target exists within the radar detection distance and a distance from the life target to the array antenna module.

Figure 3:
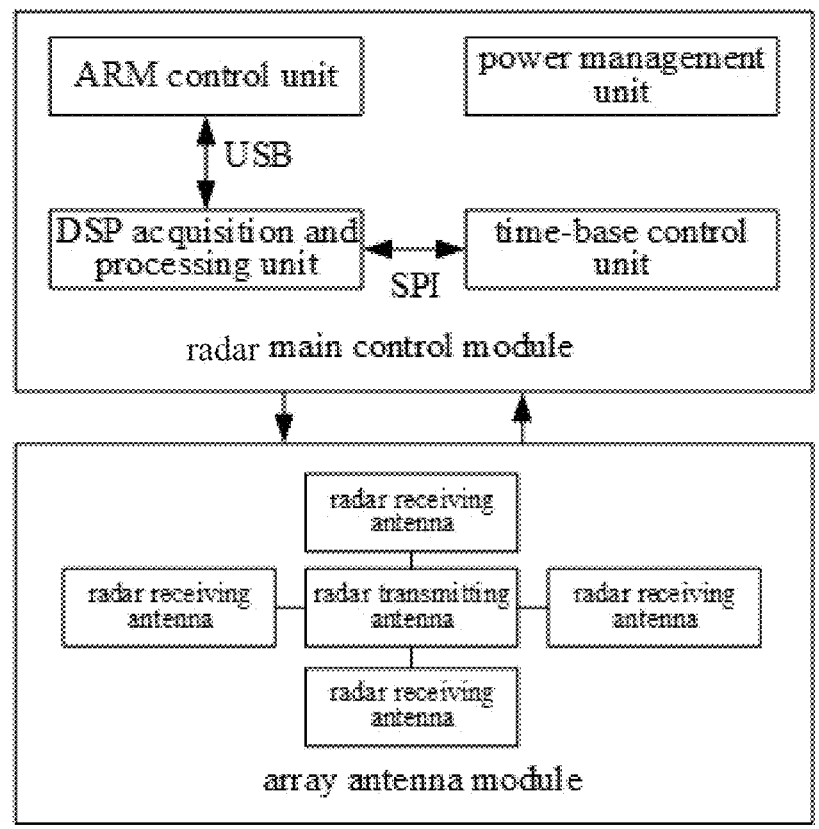
FIG. 3 is a schematic diagram illustrating a structure of a multi-target life detection radar according to the present disclosure.

The multi-target life detection radar according to the present disclosure includes the radar main control module, the array antenna module, and the control display. The radar main control module and the array antenna module are electrically connected to each other by cables, and are structurally connected to each other by metal foldable arms. The radar main control module and the control display are connected via WiFi. The radar main control module includes an ARM control unit, a DSP acquisition and processing unit, a time-base control unit and a power management unit. The control display is configured to communicate with the radar main control module, to control an operation of the entire system, and to display a detection result. FIG. 3 illustrates a structure of the multi-target life detection radar.

During detection, the array antenna module emits electromagnetic wave signals to a detection area. Reflection waves of the radar are modulated based on life information of a target. After receiving the reflection waves containing the life information, the array antenna module transmits data to the DSP acquisition and processing unit for signal processing, and then the processed data is transmitted to the control display through wireless WiFi for display.

As an example, the array antenna module includes one radar transmitting antenna 1 and a plurality of radar receiving antennas 2. The radar transmitting antenna 1 is movably connected to each radar receiving antenna 2 by using a foldable arm. The radar transmitting antenna 1 is configured to transmit a life detection radar signal. The radar receiving antenna 2 is configured to receive an original echo signal of the life detection radar signal.

The array antenna module is a core hardware system of the life detection radar for the reason that the key performance such as sensitivity and stability of the array antenna module directly determines an ability of the ultra-wide band (UWB) life detection radar in detecting living targets. Regarding requirements of high sensitivity and strong penetrability in detection of people under complex ruin conditions, an UWB radar transmission system with a center frequency of 400 MHz and a bandwidth of 400 MHz is adopted in this embodiment, such that both the detection sensitivity and penetrability are taken into consideration. In addition, technologies such as high-precision digital stepping, DSP+AD acquisition and processing and ARM control integration are adopted, thereby completing and achieving the design of a high-performance front-end system of the UWB detection radar. As the key technology of the front-end system of the UWB radar for search and rescue, the digital stepping mainly includes the design of timing generation of a host and a pulse forming circuit. The performance of the digital stepping not only determines the quality of signal transmission, but also determines the equivalent sampling accuracy of a receiver, so the detection sensitivity of the UWB radar may be directly affected. On the basis of the equivalent sampling technology and high-speed digital chips, a high-precision, low-jitter step control logic circuit, with the minimum step size being not greater than 10 ps and the jitter being not greater than 10 ps, is designed for the host of the radar. Theoretically, the radar may sense a micro-movement (micro-movements of a body surface caused by breathing mostly range from a few millimeters to a few centimeters) of 1.5 mm in the air from the target. Consequently, signal sampling with high distance-distinction ability may be achieved, thereby laying a foundation for detecting and extracting vital signs from people buried deep in ruins.

In the embodiment, the array antenna module is structurally provided with a plurality of foldable metal articulated arms in design. The radar transmitting antenna 1 is connected to the plurality of radar receiving antennas 2 by deformable and foldable arms, and cables therebetween are arranged in the foldable arms. Distances between the radar transmitting antenna 1 and the radar receiving antennas 2 may be adjusted freely within 1.08 meters through the unfolding and folding of the foldable arms.

As an example, the array antenna module includes one radar transmitting antenna 1 and four radar receiving antennas 2.

Figure 4:
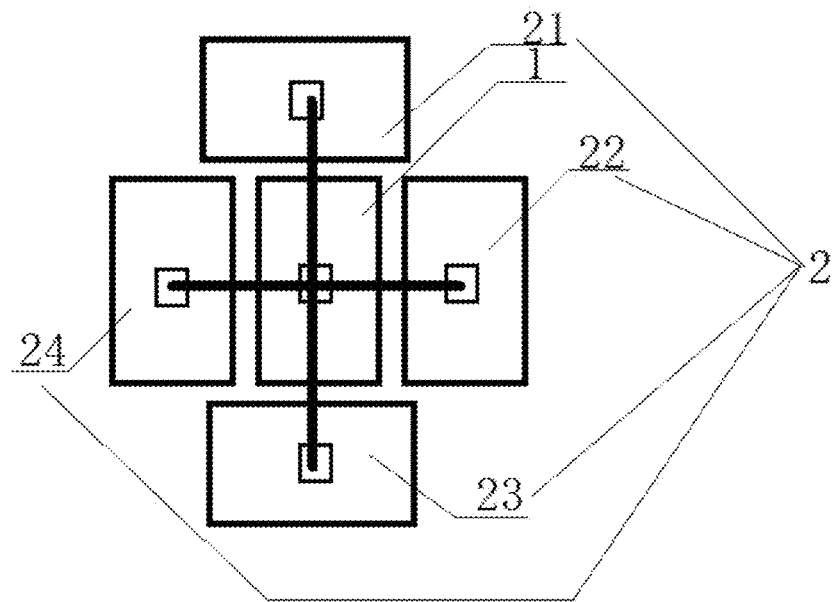
FIG. 4 is a schematic diagram of folded detection of an array antenna module according to the present disclosure.
Figure 5:
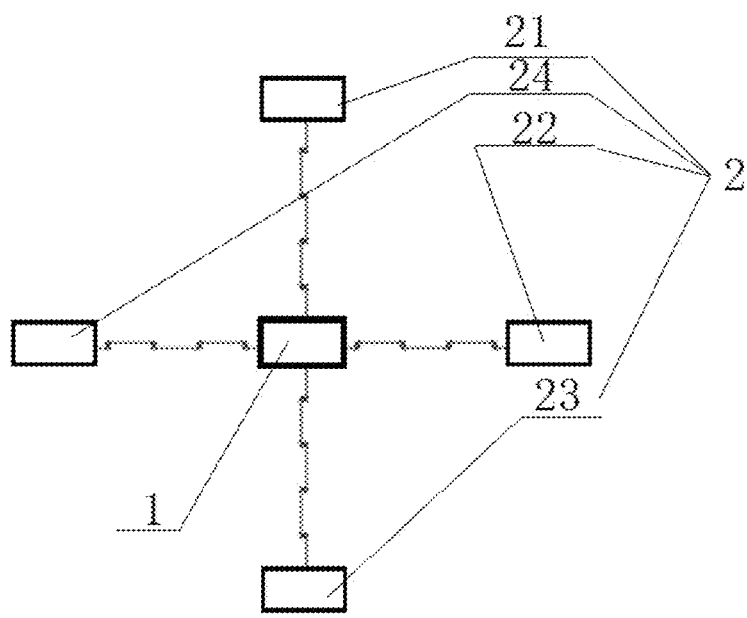
FIG. 5 is a schematic diagram of unfolded detection of an array antenna module according to the present disclosure.

As illustrated in FIGS. 4 and 5, a first radar transmitting antenna 21, a second radar transmitting antenna 22, a third radar transmitting antenna 23, and a fourth radar transmitting antenna 24 are provided at the center of a foldable bracket. The four radar transmitting antennas may be provided on the upper, lower, left and right articulated arms of the foldable bracket, and form different detection modes by adjusting unfolding, folding and rotation of each radar receiving antenna. A battery is provided in the radar transmitting antenna 1, and is detachable, such that charging of the battery may be facilitated.

The structural design of the array antenna module achieves flexible arrangements of antennas during detection, and may make multi-path penetration detection of ruins from different positions and different angles possible, so that a probability in finding out the target is greatly increased. The design of multi-degree-of-freedom foldable arms allows probes of the life detection radar to adapt to the complex ruin detection environment, be brought into close contact with irregular and complex ruin surfaces, reduce attenuation of the electromagnetic waves in the air caused by the probes hanging in the air, and improve the penetration detection ability. At the same time, the number of probes may be increased or decreased according to practical detection needs to form detection modes with different numbers of probes. Based on the above system and structural design, the life detection radar according to the present disclosure has at least the following three typical detection modes.

1. Folded Detection Mode

The folded detection mode refers to a detection mode in which the first radar transmitting antenna 21, the second radar transmitting antenna 22, the third radar transmitting antenna 23, and the fourth radar transmitting antenna 24 are respectively arranged around the radar transmitting antenna 1 and close to the radar transmitting antenna 1, as illustrated in FIG. 4. Since the radar transmitting antenna and the radar receiving antennas are folded to be together, which approximately leads to a detection mode that integrates reception and transmission, there is no attenuation between the transmitting and receiving units caused by propagation delay of the electromagnetic waves. In view of this, the folded detection mode has strong penetrability and is suitable for detecting and identifying human targets under thick media.

2. Unfolded Detection Mode

The unfolded detection mode refers to a planar antenna array detection mode in which the first radar transmitting antenna 21, the second radar transmitting antenna 22, the third radar transmitting antenna 23, and the fourth radar transmitting antenna 24 are respectively arranged around the radar transmitting antenna 1 and the foldable arms are fully unfolded in a crisscross shape, as illustrated in FIG. 5. Since distances between the radar transmitting antenna and the radar receiving antennas that have been fully unfolded may reach 1.08 meters (from a geometric center of the radar transmitting antenna to a geometric center of the radar receiving antenna), the unfolded detection mode has a strong target positioning ability and is suitable for multi-target detection, identification and positioning requiring penetrating brick walls (with flat detection surfaces).

3. Ruin Detection Mode

Figure 6:
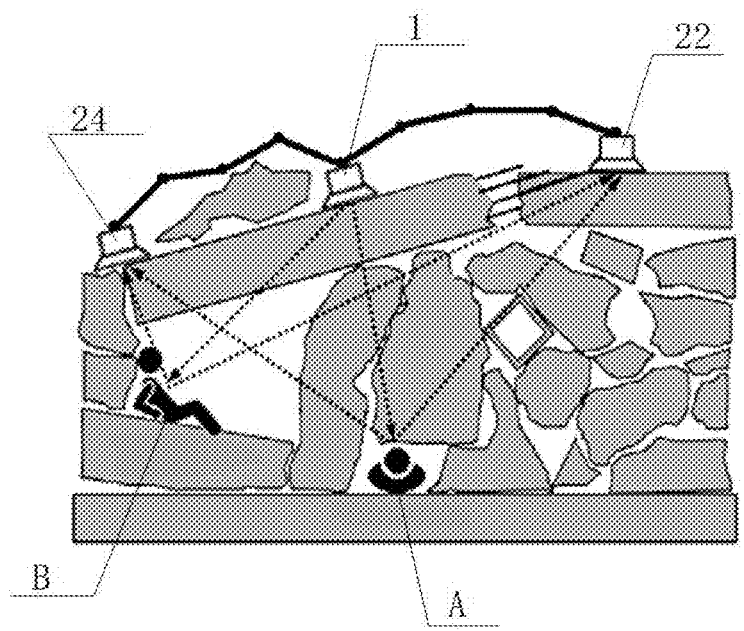
FIG. 6 is a schematic diagram of ruin detection of an array antenna module according to the present disclosure.

The ultra-wide band radar receiving and transmitting antennas have the lowest energy attenuation and the best detection effect when the antennas are closely coupled to detection media. FIG. 6 is an example of a ruin detection mode of a multistatic deformable life detection radar (adopting a detection mode having one radar transmitting antenna and two radar receiving antennas). As illustrated, two human targets are buried under ruins at different positions and in different depths. A conventional life detection radar either causes energy attenuation as not every receiving or transmitting unit may be guaranteed to be closely coupled to ruin surfaces (e.g., for a fixed-array multistatic life detection radar), or can only perform detection at one detection point (e.g., for a monostatic life detection radar), which may be difficult to penetrate when it happens to represent the thickest ruin path. When the multi-target life detection radar according to the present disclosure is used to perform detection on the ruins as illustrated in FIG. 6, the structural design of the deformable foldable arms makes the selection of detection points and detection paths more flexible, and may ensure the detection and identification of each target to the greatest extent and reduce energy attenuation by ensuring that each receiving or transmitting unit may be closely coupled with surfaces of the complex ruins. Taking detection of a second human target B as an example, after electromagnetic waves transmitted by the radar transmitting antenna reach the second human target B, the electromagnetic waves are provided with the breath of the second human target B and the like life signals and then are reflected back to the radar receiving antenna 22 and the radar receiving antenna 24 respectively in two paths. The two paths have different lengths in propagation of the electromagnetic waves and can penetrate through ruin media of different thicknesses, so that two channels formed by the radar transmitting antenna-radar receiving antenna 22 and the radar transmitting antenna-radar receiving antenna 24 produce two detection and identification results for the second human target B. The two results can be mutually verified and complementary, thereby increasing the probability of target detection and reducing missed detections.

Embodiment 3

Figure 7:
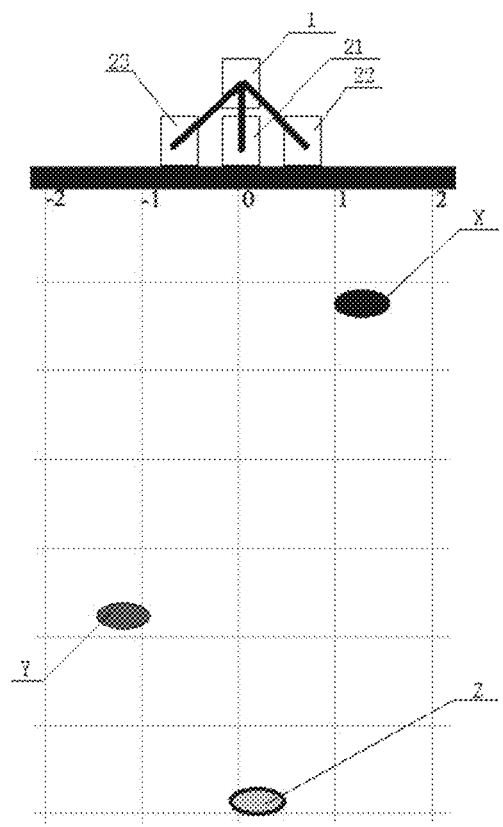
FIG. 7 is a schematic diagram of a three-target detection scenario according to an embodiment of the present disclosure.

In the embodiment, under laboratory conditions, the life detection radar according to the present disclosure is used to perform through-wall detection on three human targets. FIG. 7 illustrates an experimental scenario. The experiment uses three channels for detection, i.e., one transmitting unit and one receiving unit are arranged closely in the center, and the other two receiving units, in the same straight line with the transmitting unit, are arranged on two sides of the transmitting unit and one meter away from the transmitting unit in the center. The brick wall is a red brick wall with a thickness of 24 cm. Three human targets stand still and breathe calmly behind the wall. Respective positions of the three targets are illustrated in FIG. 7. A first target X is located at a position about 1.1 meters away from an axial distance of the radar and deviated to the right, a second target Y is located at a position about 4.8 meters away from the axial distance of the radar and deviated to the left, and a third target Z is located at a position about 6.9 meters away from the axial distance of the radar and is near the central axis of the radar. In the embodiment, data collected by channel one (that is, a channel in the middle) is used as an example to illustrate the multi-target detection and identification method.

Figure 8:
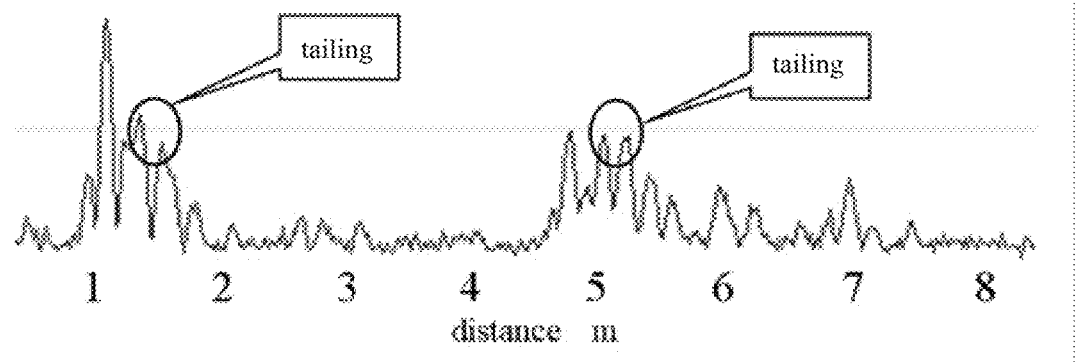
FIG. 8 is a schematic diagram of a first echo signal after time accumulation according to an embodiment of the present disclosure.

The above-mentioned multi-target detection and identification method is used to perform processing and target identification on the radar original echo signal collected by channel one. FIG. 8 illustrates the first echo signal obtained after performing preprocessing and the time accumulation on the radar original echo signal. After a certain amount of time accumulation, signal amplitudes of positions of targets increase and are higher than signal amplitudes of other positions, forming several "wave peaks". However, the number of "wave peaks" is greater than the actual number of the targets, and the "wave peaks" are followed by "tailing".

Figure 9:
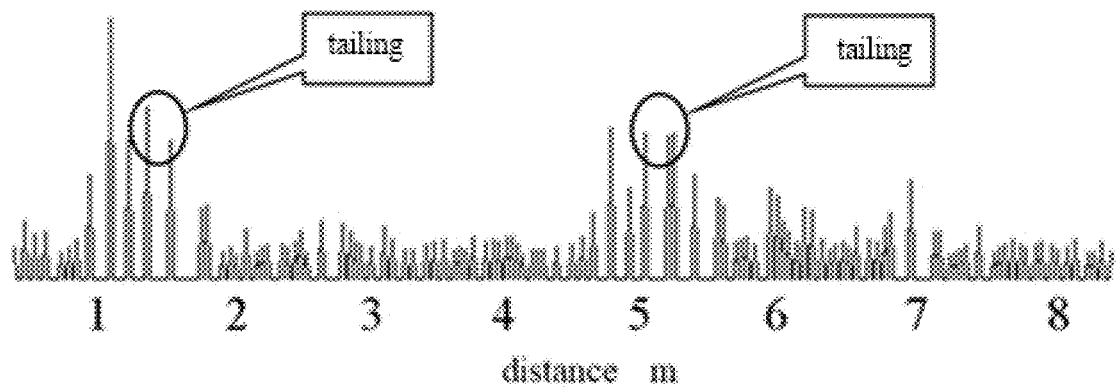
FIG. 9 is a schematic diagram of an echo signal obtained after one envelope extraction of inflection points according to an embodiment of the present disclosure.

In the embodiment, a first envelope extraction is performed on the first echo signal to obtain a vector signal after the first envelope extraction. As illustrated in FIG. 9, it may be seen that signals at positions of the non-inflection points are set to zero. Although some noises and interference with small amplitudes are removed, the target still cannot be identified.

Figure 10:
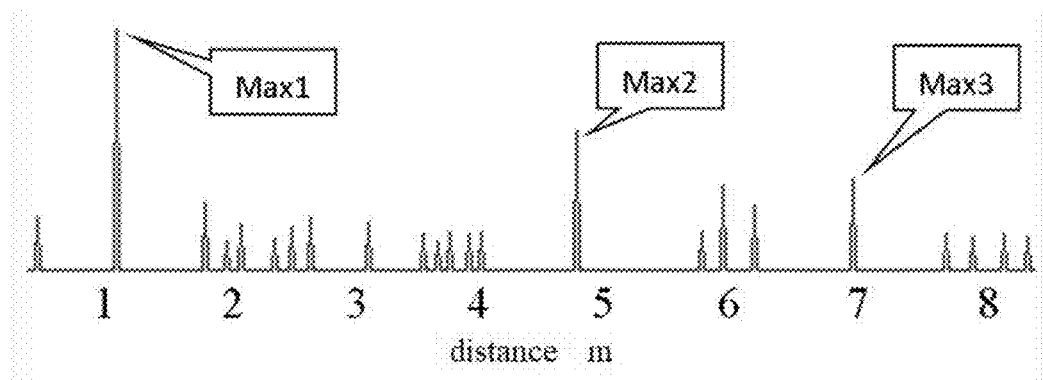
FIG. 10 is a schematic diagram of a second echo signal according to an embodiment of the present disclosure.

Therefore, a second envelope extraction is performed to obtain the second echo signal. A bubble sort algorithm is used to process the second echo signal so as to calculate the first three largest values (the first largest value, the second largest value, and the third largest value). The first three largest values are labeled as $Max_1$, $Max_2$, and $Max_3$ one by one. As illustrated in FIG. 10, values around the first three largest values are set to zero to obtain a signal (the second echo signal) with the "tailing" removed after the second envelope extraction.

An average value of all amplitude signals other than the first three largest values in the second echo signal with the "tailing" removed is calculated to obtain a background average value Background. A ratio Q of each of the three largest values to the Background is calculated. Through setting a suitable threshold, it is determined whether the three largest values are the targets. If one largest value is a target, a distance corresponding to an abscissa of the largest value is an axial distance from the radar to the target. The determination result of the embodiment using the algorithm described in the present disclosure lies in that there are three targets in the detection area, and positions of the three targets are 1.1 meters, 4.7 meters, and 7.0 meters, respectively, away from the axial distance of the radar. The number and positions of the targets are consistent with the actual situation, so the detection result is correct.

What is claimed is:

1. A multi-target life detection method based on a radar signal, comprising:
   step 1 of transmitting a life detection radar signal and receiving an original echo signal of the life detection radar signal;
   step 2 of performing distance accumulation and noise cancellation on the original echo signal sequentially to obtain a preprocessed echo signal;
   step 3 of performing time accumulation on the preprocessed echo signal to obtain a first echo signal, the first echo signal comprising a plurality of amplitude signals and each amplitude signal corresponding to one radar detection distance; and
   step 4 of performing an envelope extraction of inflection points on the first echo signal to obtain a second echo signal, wherein the performing an envelope extraction of inflection points comprises:
    finding a plurality of amplitude signals of inflection points in the first echo signal; and
    zeroing all amplitude signals in the first echo signal other than the plurality of amplitude signals of inflection points, wherein an amplitude signal of an inflection point is greater than two adjacent amplitude signals on left and the right sides of the amplitude signal of the inflection point;
step 5 of sorting amplitude signals in the second echo signal in descending order of amplitudes, wherein sorting amplitude signals comprises:
    selecting first M amplitude signals as M marked amplitude signals, and
    calculating an average value of all amplitude signals in the second echo signal other than the M marked amplitude signals, M being a positive integer greater than 1; and
step 6 of obtaining a ratio of each marked amplitude signal to the average value,
    when the ratio being greater than a threshold, determining that a living target exists at a radar detection distance corresponding to the marked amplitude signal;
    otherwise, determining that no living target exists at the radar detection distance corresponding to the marked amplitude signal.

2. The method according to claim 1, wherein the step 2 comprises:
    step 21 of performing the distance accumulation on the original echo signal to obtain a distance-accumulated echo signal;
    step 22 of performing normalization on the distance-accumulated echo signal to obtain a normalized echo signal; and
    step 23 of performing denoising on the normalized echo signal to obtain the preprocessed echo signal.

3. The method according to claim 2, wherein in the step 23 of performing the denoising on the normalized echo signal, smooth filtering is adopted to obtain the preprocessed echo signal.

4. The method according to claim 2, wherein in the step 3 of performing the time accumulation on the preprocessed echo signal, the time accumulation is performed on 200th to 1,200th paths of echo signal in the preprocessed echo signal.

5. The method according to claim 2, wherein the second echo signal is obtained by performing two envelope extractions of inflection points on the first echo signal.

6. The method according to claim 2, wherein the step 5 comprises:
    step 51 of sorting the amplitude signals in the second echo signal in descending order of amplitudes, and then selecting the first M amplitude signals as the M marked amplitude signals;
    step 52 of zeroing Z amplitude signals before and after each of the M marked amplitude signal in the second echo signal, Z being a positive integer; and
    step 53 of calculating an average value of all amplitude signals in the second echo signal other than the M marked amplitude signals.

7. The method according to claim 6, wherein M=3, and Z=5.

8. A multi-target life detection radar, configured to implement the multi-target life detection method according to claim 1, the multi-target life detection radar comprising an array antenna module, a radar main control module and a control display,
    wherein the array antenna module is connected to the radar main control module, and is configured to transmit a life detection radar signal and to receive an original echo signal of the life detection radar signal;
    the radar main control module is connected to the control display, and is configured to perform distance accumulation and noise cancellation on the original echo signal sequentially to obtain a preprocessed echo signal;
    the radar main control module is further configured to perform time accumulation on the preprocessed echo signal to obtain a first echo signal, the first echo signal comprising a plurality of amplitude signals and each amplitude signal corresponding to one radar detection distance;
    the radar main control module is further configured to perform an envelope extraction of inflection points on the first echo signal to obtain a second echo signal, wherein the performing an envelope extraction of inflection points comprises:
        finding a plurality of amplitude signals of inflection points in the first echo signal; and
        zeroing all amplitude signals in the first echo signal other than the plurality of amplitude signals of inflection points, wherein an amplitude signal of an inflection point is greater than two adjacent amplitude signals on left and right sides of the amplitude signal of the inflection point;
    the radar main control module is further configured to:
        sort amplitude signals in the second echo signal in descending order of amplitudes; and
        select first M amplitude signals as M marked amplitude signals; and
        calculate an average value of all amplitude signals in the second echo signal other than the M marked amplitude signals, M being a positive integer greater than 1;
    the radar main control module is further configured to:
        obtain a ratio of each marked amplitude signal to the average value;
        when the ratio being greater than a threshold, determine that a living target exists at a radar detection distance corresponding to the marked amplitude signal;
        otherwise, determine that no living target exists at the radar detection distance corresponding to the marked amplitude signal; and
    the control display is configured to output a detection result of the radar main control module, the detection result indicating whether a living target exists within the radar detection distance and a distance from the living target to the array antenna module.

9. The radar according to claim 8, wherein the array antenna module comprises one radar transmitting antenna and a plurality of radar receiving antennas, wherein
    the radar transmitting antenna being movably connected to each of the plurality of radar receiving antennas through a foldable arm; and
    the radar transmitting antenna is configured to transmit the life detection radar signal; and
    the plurality of radar receiving antennas is configured to receive the original echo signal of the life detection radar signal.

10. The radar according to claim 9, wherein the array antenna module comprises one radar transmitting antenna and four radar receiving antennas.

\* \* \* \* \*